United States Patent [19]

Matsushita et al.

[11] 3,885,019

[45] May 20, 1975

[54] CATALYTIC REDUCING DECOMPOSITION OF OXIDES OF NITROGEN

[75] Inventors: Kunichi Matsushita, Kawasaki; Hikaru Sakurada, Yokohama; Kazuhiko Onuma, Kawasaki, all of Japan

[73] Assignee: Mitsubishi Chemical Industries, Ltd., Japan

[22] Filed: Dec. 26, 1973

[21] Appl. No.: 428,222

[30] Foreign Application Priority Data

Dec. 25, 1972 Japan.................................. 48-784

[52] U.S. Cl. ................ 423/213.2; 60/301; 423/239
[51] Int. Cl. .............................................. B01d 53/00
[58] Field of Search ........... 423/239, 213.2; 60/300

[56] References Cited
UNITED STATES PATENTS

| 3,008,796 | 11/1961 | Anderson et al. .................. 423/235 |
| 3,140,148 | 7/1964 | Hofer et al. ...................... 423/213.2 |
| 3,449,063 | 6/1969 | Griffing et al. .................. 423/213.2 |
| 3,649,169 | 3/1972 | Nicklin et al. .................. 423/244 X |

FOREIGN PATENTS OR APPLICATIONS

| 1,259,298 | 1/1968 | Germany ............................ 423/239 |
| 1,412,713 | 8/1965 | France ................................ 423/239 |

*Primary Examiner*—G. O. Peters
*Attorney, Agent, or Firm*—Oblon, Fisher, Spivak, McClelland & Maier

[57] ABSTRACT

The oxides of nitrogen in an exhaust gas are reductively decomposed over a catalyst of cerium oxide or uranium oxide in the presence of ammonia.

11 Claims, No Drawings

3,885,019

CATALYTIC REDUCING DECOMPOSITION OF OXIDES OF NITROGEN

BACKGROUND OF THE INVENTION

1. Field of the Invention

The present invention relates to the catalytic reduction of oxides of nitrogen. More particularly, the invention relates to an improvement in the catalytic reduction of oxides of nitrogen in the exhaust gases discharged from an internal combustion engine or nitric acid plant or the like.

2. Description of the Prior Art

Oxides of nitrogen (hereinafter referred to as $NO_x$) such as nitrogen monoxide (NO) and nitrogen dioxide ($NO_2$) are toxic to the human body. When nitrogen oxides are absorbed by the human body, body functions begin to decrease thus, there is a very demanding need for efficient methods of removing $NO_x$ because they cause photochemical smog by their oxidizing utilities. It is most important, therefore, that nitrogen oxides be removed from exhaust gases from polluting sources such as power plants, nitric acid plants, automobiles, and the like.

The conventional methods for removing $NO_x$ heretofore, have included scrubbing, absorption, and catalytic methods. The various types of catalytic methods include those in which an exhaust gas is contacted with a catalyst and those in which an exhaust gas is contacted with a catalyst and a reducing agent. It has been difficult to obtain satisfactory results with scrubbing and absorption methods. In the catalytic methods in which no reducing agents are used, platinum group metals, oxides of transition metals, oxides of rare earth metals and the like have been used as catalysts. With this type of catalytic method, however, it has been difficult to obtain effective results without using temperatures greater than 600°C.

On the other hand, the catalytic reducing decomposition methods it has been known to use platinum group metal catalysts, and hydrogen, carbon monoxide, natural gas hydrocarbons or liquid petroleum gas as a reducing agent. The catalytic reducing methods have certain advantage compared to other conventional methods.

Usually exhaust gases contain from 0.5–10 vol % oxygen. For example, exhaust gases discharged from automobiles contain 0.5 vol % oxygen, and exhaust gases discharged from nitric acid plants contain 3 vol% oxygen. Accordingly, the reducing agent present in the exhaust gases is exhausted by reaction with oxygen to complete combustion. In order to remove nitrogen oxides then, excess amounts of the reducing agent are required. If the concentration of oxygen is high, it is difficult to remove the heat generated by the reaction of the reducing agent with oxygen. This has been a serious drawback with the catalytic reduction method.

Another catalytic reduction method which is known involves the use of platinum as a catalyst and ammonia as a reducing agent. In the method, it has been difficult to prevent the side reaction of ammonia with oxygen. Further, more than half of the oxides of nitrogen are not reduced to nitrogen, but form $N_2O$.

A need, therefore, continues to exist for a catalytic reduction method which removes nitrogen oxides from exhaust gases by converting the nitrogen oxides to nitrogen.

SUMMARY OF THE INVENTION

Accordingly, one object of the present invention is to provide a catalytic method for the reductive decomposition of oxides of nitrogen at high nitrogen oxide removal rates.

Another object of the invention is to provide a catalytic method for the reductive decomposition of oxides of nitrogen in exhaust gases with high activity and without substantial reaction between ammonia and oxygen.

Briefly, these objects and other objects of the invention as hereinafter will become more readily apparent can be attained by the reduction of oxides of nitrogen in exhaust gases over a catalyst of cerium oxide or uranium oxide in the presence of ammonia.

DETAILED DESCRIPTION OF THE PREFERRED EMBODIMENTS

The catalytic components of the catalyst of the present invention can be cerium oxides or uranium oxides. Cerium oxides are especially preferred.

The catalytic components can be supported on a carrier, if necessary. Suitable carries include alumina, silica, silica-alumina, zirconia, titania, cordierite, mullite, diatomaceous earth, silicon carbide, and the like. Preferably $\alpha$-alumina is used. It is especially preferably to use a carrier which is prepared by calcining $\gamma$-alumina at 550°–1000°C. to yield an alumina carrier which is partially converted to $\alpha$, $\delta$ or $\theta$-alumina, from the viewpoint of strength and other properties.

The shape and size of the carrier used can be chosen depending upon the applications intended. Various sizes of spherical, pellet and honeycomb shaped carriers can be used. The honeycomb type carrier has the advantage that it provides a system that has little pressure loss, even when the flow velocity, i.e. the space velocity of the mixture gas of the exhaust gas and ammonia is high. Honeycomb carriers include those having guadrangular, triangular and circular sectional shapes. It is also possible to use those having a sinusoidal wave, spider's web or spiral shape.

Preferable carriers also include ceramics such as mullite, cordierite, and $\alpha$-alumina coated with $\gamma$-alumina of a suitable size. In order to coat the ceramic base it is immersed in a slurry, suspension or colloidal solution of $\gamma$-alumina, or boehmite or aluminum hydroxide (which can be converted to $\gamma$-alumina by calcination) and then isolated and calcined.

Another preferred carrier is one in which the ceramic base is coated with titanium oxide. In order to coat the base with titanium oxide, a base is immersed in a solution of titanium tetrachloride, titanium trichloride or titanium sulfate for a predetermined time and is then isolated and kept in air or is treated with ammonia, whereby a coat of titanium oxide is formed by oxidation of hydrolysis of the titanium salt.

When the titanium tetrachloride is used, the complete conversion to titanium oxide is indicated by the lack of white smoke which is generated upon hydrolysis. The product is then washed with water at room temperature and if necessary, is calcined.

The acid treatment of a carrier with a mineral acid such as sulfuric acid, nitric acid, hydrochloric acid or an organic acid such as acetic acid before applying the catalytic component is very effective in improving the activity of the catalyst.

In order to perform the acid treatment, the carrier is immersed in an acid at 0°–100°C, preferably 20°–60°C for 1–5 hours. The time of the acid treatment is dependent upon the concentration of acid and the temperature.

It is possible to use cerium oxides or uranium oxides without using a carrier and have sufficient catalytic activity. However it is preferable to support the catalytic component on the carrier by a conventional method such as for example, by immersing the carrier in a solution of a cerium salt or a uranium slat on by spraying a solution of a cerium salt or a uranium salt onto the carrier.

Suitable cerium salts include cerium nitrate, cerium chloride, cerium sulfate, cerium ammonium nitrate or mixtures thereof.

It is not necessary to use cerium of high purity. It is possible to use cerium salts with another rare earth salt.

The carrier impregnated with the cerium salt is gradually heated in air or a nitrogen atmosphere until dry and then is calcined at 400°–700°C to yield a catalyst coated with cerium oxide. The cerium oxide is most effectively supported by the carrier, in amounts ranging from 0.1–50% by weight, preferably 1–30% by weight based on the total weight of the catalyst, i.e. the catalyst component and the carrier.

In the preparation of the catalyst, it is preferable to wash the carrier, which impregnates the cerium salt into the carrier, with water, aqueous ammonia or an aqueous solution of an ammonium salt such as ammonium carbonate, ammonium formate, ammonium acetate, or the like prior to drying and calcination of the catalyst. The concentration of the ammonia solution or the aqueous solution of ammonium salt used for washing usually has a normality ranging from 1–20. The washing treatment has a normality ranging from 1–20. The washing treatment is conducted at temperatures less than 100°C, preferably at about room temperature for 10 minutes to 2 hours. For example, the carrier can be washed for less than 1 hours in a quiescent solution at temperatures higher than 50°C, or while being stirred at room temperature.

In order to conduct the catalytic reductive decomposition of $NO_x$ in exhaust gases with the catalyst prepared by the method above the exhaust gas and ammonia gas is contacted with the catalyst. It is very effective to pass an exhaust gas through the catalyst zone at a space velocity of 1,000–150,000 $hr^{-1}$, preferably 5,000–100,000 $hr^{-1}$ at a temperature of 200°–650°C, preferably 250°–550°C. More than equimolar amounts, preferably more than 1.5 mole of ammonia gas per mole of $NO_x$ is added to the exhaust gas.

In accordance with the process of the invention, substantially high reductive activities for $NO_x$ are found when the oxygen content of the exhaust gas is higher than 0.1 vol%, especially higher than 0.5 vol.% and the reduction products are nitrogen and water.

The catalyst of the present invention has excellent activity over broad ranges of temperature. That is, the catalyst of the present invention exhibits low variations in its catalytic activity while maintaining a high catalytic activity. Thus, the catalyst can be used for various applications in many fields, and the catalytic reduction of $NO_x$ is significantly effective to prevent air pollution.

Having generally described this invention, a further understanding can be obtained by reference to certain specific examples which are provided herein for purposes of illustration only and are not intended to be limiting unless otherwise specified.

In the examples, the concentration of $NO_x$ was measured by the chemiluminescence method with a chemiluminescent $NO_x$ analyzer (nitrogen oxide analyzer CLM-201 manufactured by Shimazu-seisaku-sho K.K.), and the $NO_x$ removal rate was calculated from the data showing the concentration of $NO_x$ before and after the catalytic reductive decomposition.

EXAMPLE 1

Preparation of the Catalyst

1. In an aqueous solution of 6.54 g of cerium nitrate [$Ce(NO_3)_3 \cdot 6H_2O$] dissolved in 10 ml of deionized water, 10 ml of γ-alumina particles having an average diameter of 5 mm was immersed for 1 hour, and the alumina was isolated and dried at 100°–110°C for about 2–3 hours. The dried product was calcined at 250°C for 1 hour, at 350°C for 1 hour and then at 500°C for 3 hours to yield a catalyst containing 10% by weight cerium oxide. This process was followed using 3.27 g of cerium nitrate, whereby a catalyst containing 5% by weight cerium oxide was obtained.

2. In an aqueous solution of 2.57 g of uranium nitrate $UO_2(NO_3)_2 \cdot 6H_2O$ dissolved in 15 ml of deionized water, 13 ml of γ-alumina used in Example 1 was immersed for 1 hour. The particles were then isolate, and fired as above. By this procedure a catalyst containing 5% by weight of uranium oxide was obtained.

Catalytic Reduction of $NO_x$

A gas mixture of 10% by volume oxygen, nitrogen and the $NO_x$ gas mentioned in Table 1 wherein the remainder of the gas is nitrogen and $NH_3$ gas was fed over a bed of the catalyst prepared above at a space velocity of 20,000 hour-1 at the temperature shown in Table 1 to reduce the nitrogen oxides. The result are shown in Table 1.

TABLE 1

| Experiment No. | Metal oxide | Amount of metal oxide supported (wt.%) | Reaction temperature (°C) | added $NH_3$ (ppm) | $NO_x$ before decomposition (ppm) | $NO_x$ after decomposition (ppm) | $NO_x$ removal rate (%) |
|---|---|---|---|---|---|---|---|
| 1 | $CeO_2$ | 10 | 395 | 3000 | 1940 | 645 | 66.8 |
|   |   |   | 385 | 3880 | 1940 | 625 | 67.8 |
|   |   |   | 440 | 3000 | 1940 | 730 | 62.5 |
| 2 | $CeO_2$ | 5 | 320 | 2540 | 1950 | 915 | 53.0 |
|   |   |   | 360 | 2540 | 1950 | 830 | 57.5 |
|   |   |   | 420 | 2540 | 1950 | 830 | 57.5 |
|   |   |   | 400 | 3880 | 1950 | 750 | 61.5 |
| 3 | $UO_3$ | 5 | 300 | 3000 | 2000 | 965 | 51.7 |
|   |   |   | 390 | 3000 | 2000 | 645 | 67.7 |
|   |   |   | 440 | 3000 | 2000 | 590 | 70.5 |
|   |   |   | 500 | 3000 | 2000 | 635 | 68.2 |
|   |   |   | 420 | 2100 | 2000 | 665 | 66.7 |

EXAMPLE 2

Preparation of the Catalyst

A cylindrically shaped honeycomb (17 mm diameter, 25 mm height) catalyst support prepared by calcining γ-alumina at 800°C, was immersed in an aqueous solution of 5.669 g of cerium nitrate ($Ce(NO_3)_3 \cdot 6H_2O$) for 6 hours and isolated, dried and calcined in accordance with the process of Example 1. By this procedure a catalyst having a 6% by weight cerium oxide content was obtained.

Catalytic Reduction of $NO_x$

A gas mixture containing 2000 ppm of $NO_x$, 10% by volume oxygen, 3000 ppm of ammonia and nitrogen as the remainder, was passed through the catalyst prepared by the above process at a space velocity of 40,000 $hr^{-1}$ at the temperatures shown in Table 2 in order to reduce $NO_x$. The results are shown in Table 2.

TABLE 2

| Reaction temperature (°C) | $NO_x$ removal rate (%) |
|---|---|
| 380 | 72.8 |
| 420 | 75.5 |
| 450 | 73.5 |

EXAMPLE 3

Preparation of the Catalyst

1. A cylindrically shaped honeycomb (17 mm diameter, 25 mm height) catalyst support made of α-alumina coated with γ-alumina was immersed in an aqueous solution of 9.067 g of cerium nitrate for 6 hours and isolated, dried and calcined in accordance with the process of Example 1. By this procedure a catalyst having 6% by weight cerium oxide was obtained.

2. A honeycomb support made of mullite coated with γ-alumina which was prepared by immersing the mullite in a slurry of γ-alumina and drying the isolated support (same size), was used to prepare a catalyst by the above procedure having 6% by weight cerium oxide.

3. A honeycomb support made of cordierite coated with γ-alumina was used in the above process to yield a catalyst having 6% by weight cerium oxide.

Catalytic Reduction of $NO_x$

In accordance with the procedure of Example 2, the catalytic reduction decomposition of $NO_x$ was conducted using the catalysts prepared by procedures 1–3 above. The results are shown in Table 3.

TABLE 3

| Experiment No. | Carrier | Amount of Catalyst (g) | Reaction Temperature (°C) | $NO_x$ removal rate (%) |
|---|---|---|---|---|
| 1 | γ-alumina | 5.94 | 370 | 73.8 |
|  |  |  | 430 | 80.5 |
|  |  |  | 460 | 78.0 |
| 2 | Mullite | 5.86 | 320 | 60.0 |
|  |  |  | 380 | 83.8 |
|  |  |  | 440 | 89.5 |
|  |  |  | 480 | 86.5 |
| 3 | cordierite | 5.56 | 360 | 78.0 |
|  |  |  | 420 | 83.5 |

EXAMPLE 4

Preparation of the Catalyst

1. A 15 ml quantity of γ-alumina was immersed in 15 ml of titanium tetrachloride and isolated and oxidized in an atmosphere of air for several hours. The product was washed with water for several minutes and then dried by evaporation. The dried product was calcined at 500°C for 3 hours in a flow of nitrogen. By this procedure, 15 ml of γ-alumina coated with titanium oxide was obtained. A 15 ml quantity of the γ-alumina coated with titanium oxide was immersed in 15 ml of an aqueous solution of 9.34 g of cerium nitrate for 3 hours. The mixture was concentrated and dried at 500°C for 3 hours. By this procedure an γ-alumina substrate coated with 10% by weight of cerium oxide was obtained.

2. The procedure of Example 4-(1) was followed except that α-alumina was used instead of γ-alumina. By this procedure an α-alumina carrier coated with titanium oxide was obtained. A 15 ml amount of the α-alumina carrier coated with titanium oxide was immersed in 15 ml of aqueous solution of 15.2 g of cerium nitrate for 3 hours. The mixture obtained was dried and calcined under the same conditions of Examples 4-(1). By this procedure a catalyst of α-alumina coated with titanium oxide and containing 10% by weight cerium oxide was obtained.

3. The procedure of Example 4-(1) was followed except that silica having the same particle size diameter instead of γ-alumina was used. A silica carrier coated with titanium oxide was obtained. A 15 ml amount of the silica carrier coated with titanium oxide was immersed in 15 ml of an aqueous solution of 6.583 g of cerium nitrate for 3 hours. The mixture obtained was dried and calcined under the same conditions of Example 4-(1). By this procedures a catalyst of silica coated with titanium oxide and containing 10% by weight cerium oxide was obtained.

4. The procedure of Example 4-(1) was followed except that silica-alumina having the same particle size diameter instead of γ-alumina was used. A silica-alumina coated with titanium oxide was obtained. A 15 ml amount of the silica-alumina carrier coated with titanium oxide was immersed in 15 ml of an aqueous solution of 9.094 g of cerium nitrate for 3 hours. The mixture obtained was dried and calcined under the same conditions of Examples 4-(1). By this procedure a catalyst of silica-alumina coated with titanium oxide and containing 5% by weight cerium oxide was obtained.

Catalytic Reduction of $NO_x$

The procedure of Example 2 was followed for the catalytic reductive decomposition of $NO_x$ using the catalysts prepared in 1–4 above.

The results are shown in Table 4.

TABLE 4

| Experiment No. | Carrier | Amount of Catalyst (g) | Reaction temperature (°C) | $NO_x$ removal rate (%) |
|---|---|---|---|---|
| 1 | γ-alumina | 7.63 | 260 | 54.8 |
|  |  |  | 310 | 71.5 |
|  |  |  | 410 | 86.3 |
|  |  |  | 450 | 87.0 |
|  |  |  | 505 | 84.3 |

TABLE 4—Continued

| Experiment No. | Carrier | Amount of Catalyst (g) | Reaction Temperature (°C) | $NO_x$ removal rate (%) |
|---|---|---|---|---|
| 2 | α-alumina | 12.15 | 340 | 81.5 |
|   |   |   | 400 | 86.0 |
|   |   |   | 450 | 82.5 |
| 3 | silica | 6.04 | 250 | 54.3 |
|   |   |   | 330 | 71.0 |
|   |   |   | 390 | 75.5 |
|   |   |   | 430 | 71.8 |
| 4 | silica-alumina | 6.64 | 240 | 60.5 |
|   |   |   | 85.8 | 85.8 |
|   |   |   | 92.3 | 92.3 |
|   |   |   | 91.0 | 91.0 |

EXAMPLE 5

Preparation of the Catalyst

1. A 15 ml amount of γ-alumina support was immersed in conc. hydrochloric acid at room temperature for 1 hour. After separating the support from the hydrochloric acid, the product was washed with water at 50°C for 1 hour and dried at 100°C for 3 hours. The treated carrier was immersed in 15 ml of aqueous solution of 15.2 g of cerium nitrate for 3 hours and was isolated and dried. The dried product was heated at 250°C for 1 hours, then 350°C for 1 hour and calcined at 550°C for 3 hours in a nitrogen gas flow. By this procedure a catalyst of γ-alumina containing 10% by weight cerium oxide was obtained.

2. The procedure of Examples 5-(1) was followed except that γ-alumina was treated with 10% sulfuric acid instead of hydrochloric acid. A 15 ml amount of the treated carrier was immersed in 15 ml of an aqueous solution of 10.024 g of cerium nitrate for 3 hours. The product obtained was calcined under the same conditions of Examples 5-(1). By this procedure a catalyst of γ-alumina containing 10% by weight cerium oxide was obtained.

3. The procedure of Example 5-(1) was followed except that γ-alumina was treated with 10% nitric acid instead of hydrochloric acid. A 15 ml amount of the treated carrier was immersed in 15 ml of an aqueous solution of 9.59 g of cerium nitrate for 3 hours. The product obtained was calcined under the same conditions of Example 5-(1). By this procedure a catalyst of γ-alumina contained 10% by weight cerium oxide was obtained.

4. The procedure of Example 5-(1) was followed except that γ-alumina was treated with 10% acetic acid instead of hydrochloric acid. A 15 ml amount of treated carrier was immersed in 15 ml of an aqueous solution of 9.59 g of cerium nitrate for 3 hours. The product obtained was calcined under the same conditions of Example 5-(1). By this procedure a catalyst of γ-alumina contains 10% by weight cerium oxide was obtained.

5. The procedure of Example 5-(1) was followed except that α-alumina was treated with 10% sulfuric acid instead of treating γ-alumina with hydrochloric acid. A 15 ml amount of the treated α-alumina was immersed in 15ml of an aqueous solution of 14.7 g of cerium nitrate for 3 hours. The product obtained was calcined under the same conditions of Example 5-(1). By this procedure a catalyst of α-alumina containing 10% by weight cerium oxide was obtained.

6. The procedure of Example 5-(1) was followed except that diatomaceous earth was treated with 10% sulfuric acid instead of α-alumina and hydrochloric acid. A 15 ml amount of the treated diatomaceous earth was immersed in 15 ml of an aqueous solution of 3.74 g of cerium nitrate for 3 hours. The product obtained was calcined under the same conditions of Examples 5-(1). By this procedure a catalyst of diatomaceous earth containing 10% by weight cerium oxide was obtained.

7. The procedure of Example 5-(1) was followed except that silicaalumina was treated with 10% sulfuric acid instead of α-alumina and hydrochloric acid. A 15 ml amount of the treated silica-alumina was immersed in 15 ml of an aqueous solution of 7.11 g of cerium nitrate for 3 hours. The product obtained was calcined under the same conditions of Example 5-(1). By this procedure a catalyst of silica-alumina containing 10% by weight cerium oxide was obtained.

Catalytic Reduction of $NO_x$

The procedure of Example 2 was used for the catalytic reductive decomposition of $NO_x$ using the catalysts above. The results are shown in Table 5.

TABLE 5

| Experiment No. | Carrier | Treating solution | Amount of catalyst (g) | Reaction temperature (°C) | $NO_x$ removal rate (%) |
|---|---|---|---|---|---|
| 1 | γ-alumina | conc.HCl | 7.33 | 310 | 61.5 |
|   |   |   |   | 360 | 80.5 |
|   |   |   |   | 460 | 91.5 |
|   |   |   |   | 540 | 88.0 |
| 2 | γ-alumina | 10%$H_2SO_4$ | 6.15 | 250 | 53.3 |
|   |   |   |   | 310 | 83.3 |
|   |   |   |   | 360 | 93.8 |
|   |   |   |   | 440 | 95.3 |
|   |   |   |   | 510 | 93.5 |
| 3 | γ-alumina | 10%$HNO_3$ | 6.77 | 320 | 67.5 |
|   |   |   |   | 380 | 82.3 |
|   |   |   |   | 460 | 87.3 |
|   |   |   |   | 520 | 84.3 |
| 4 | γ-alumina | 10%$CH_3COOH$ | 7.11 | 310 | 61.8 |
|   |   |   |   | 390 | 84.3 |
|   |   |   |   | 500 | 90.8 |
|   |   |   |   | 550 | 87.3 |
| 5 | α-alumina | 10%$H_2SO_4$ | 11.43 | 250 | 58.5 |
|   |   |   |   | 310 | 70.5 |
|   |   |   |   | 380 | 74.8 |
|   |   |   |   | 420 | 71.0 |
| 6 | diatomaceous earth | 10%$H_2SO_4$ | 3.68 | 270 | 68.5 |
|   |   |   |   | 330 | 87.0 |

TABLE 5—Continued

| Experiment No. | Carrier | Treating solution | Amount of catalyst (g) | Reaction temperature (°C) | NOₓ removal rate (%) |
|---|---|---|---|---|---|
|  |  |  |  | 430 | 93.8 |
|  |  |  |  | 510 | 93.0 |
| 7 | silica-alumina | 10%H₂SO₄ | 5.63 | 260 | 57.5 |
|  |  |  |  | 320 | 77.5 |
|  |  |  |  | 400 | 85.5 |
|  |  |  |  | 450 | 83.0 |

EXAMPLE 6

Preparation of the Catalyst

1. A 40 ml amount of γ-alumina carrier was immersed in 40 ml of an aqueous solution of 20.74 g of cerium nitrate for 1 hour. A 10 ml amount of the immersed alumina was washed with about 10 ml of water at room temperature for 10 minutes. The product was dried and heated at 250°C for 1 hour, then at 350°C for 1 hour and calcined at 550°C for 3 hours in a nitrogen flow. By this procedure a catalyst of γ-alumina containing 10% by weight cerium oxide was obtained.

2. A 10 ml amount of an alumina carrier was immersed in an aqueous solution of cerium nitrate, was washed 3 times with 10 ml of water at room temperature for 10 minute intervals (total 30 minutes). The product was calcined under the same conditions of Example 6-(1). By this procedure a catalyst of γ-alumina containing 10% by weight cerium oxide was obtained.

3. A 15 ml amount of a γ-alumina carrier was immersed in 15 ml of an aqueous solution of 3.684 g of cerium nitrate for 1 hour, and then was filtered. The product obtained was immediately immersed in 15 ml of ammonia (28% NH₃) at 60°C for 30 minutes, and then was washed with 15 ml of water of 60°C. The product was dried at 90°C for 2 hours, and then calcined under the same conditions of Example 6-(1). By this procedure a catalyst of γ-alumina containing 5% by weight cerium oxide was obtained.

4. A 15 ml amount of a γ-alumina carrier was immersed in an aqueous solution of cerium nitrate. Further, the carrier was immersed in 15 ml of an aqueous solution of 6.15 g of ammonium formate at room temperature for 1 hour, and then was filtered and washed with water for 1 hour. The product obtained was dried and calcined under the same conditions of Example 6-(3). By this procedure a catalyst of γ-alumina containing 5% by weight cerium oxide was obtained.

Catalytic Reduction of NOₓ

The procedure of Example 2 of the catalytic reductive decomposition of NOₓ was conducted using the catalysts of preparation 1–4. The results are shown in Table 6.

TABLE 6

| Experiment No. | Carrier treatment | Rate of catalyst supported (%) | Amount of catalyst (g) | Reaction temperature (°C) | NOₓ removal rate (%) |
|---|---|---|---|---|---|
| 1 | water (10 min.) | 10 | 6.77 | 360 | 69.5 |
|  |  |  |  | 390 | 73.8 |
|  |  |  |  | 420 | 76.3 |
|  |  |  |  | 460 | 73.0 |

TABLE 6—Continued

| Experiment No. | Carrier treatment | Rate of catalyst supported (%) | Amount of catalyst (g) | Reaction temperature (°C) | NOₓ removal rate (%) |
|---|---|---|---|---|---|
| 2 | water (30 min.) | 10 | 6.76 | 360 | 67.5 |
|  |  |  |  | 420 | 77.7 |
|  |  |  |  | 460 | 79.4 |
|  |  |  |  | 500 | 78.4 |
| 3 | ammonia (30 min.) | 5 | 4.46 | 350 | 60.9 |
|  |  |  |  | 410 | 68.2 |
|  |  |  |  | 440 | 64.9 |
| 4 | ammonium formate (1 hour) | 5 | 6.76 | 360 | 67.5 |
|  |  |  |  | 420 | 77.7 |
|  |  |  |  | 460 | 79.4 |
|  |  |  |  | 500 | 78.4 |

EXAMPLE 7

Preparation of the Catalyst

An 18.09 g amount of cerium oxide was molded as pellets having a diameter of 4 mm and a length of 3mm. The volume of molded cerium oxide was 8 ml.

Catalytic Reduction of NOₓ

The procedure of Example 2 was followed except that the gas was passed through the catalyst at a space velocity of 25,000 hr⁻¹. The catalytic reduction of NOₓ was conducted over the above catalyst. The results are shown in Table 7.

TABLE 7

| Reaction temperature (°C) | NOₓ removal rate (%) |
|---|---|
| 250 | 34.7 |
| 300 | 55.4 |
| 350 | 67.8 |
| 370 | 69.0 |
| 390 | 59.1 |

Having now fully described the invention, it will be apparent to one of ordinary skill in the art that many changes and modifications can be made thereto without departing from the spirit or scope of the invention as set forth herein.

What is claimed as new and intended to be convered by Letters Patent is:

1. In a process for the catalytic reduction of oxides of nitrogen present in exhaust gas, the improvement which comprises: contacting said exhaust gas with a catalyst of cerium oxide or uranium oxide in the presence of ammonia.

2. The process of claim 1, wherein said catalyst of cerium oxide is supported on a carrier.

3. The process of claim 2, wherein said carrier is selected from the group consisting of alumina, silica, silica-alumina, titania, diatomaceous earth and zirconia.

4. The process of claim 1, wherein said catalyst of cerium oxide supported on a carrier is fabricated from γ-alumina which is calcined at 550°–1000°C.

5. The process of claim 1, wherein said catalyst of cerium oxide is supported on a carrier of a base coated with γ-alumina.

6. The process of claim 1, wherein said catalyst of cerium oxide is supported on a carrier of a base coated with titanium oxide.

7. The process of claim 1, wherein said catalyst of cerium oxide is prepared by immersing a carrier treated with an acid in an aqueous solution of a cerium salt and then calcining said immersed cerium oxide.

8. The process of claim 1, wherein said catalyst of cerium oxide is prepared by immersing a carrier in an aqueous solution of a cerium salt; washing said immersed carrier in water, aqueous ammonia or an aqueous solution of an ammonium salt and than calcining said washed carrier.

9. The process of claim 1, wherein said catalyst contains 0.01 to 50% by weight cerium oxide or uranium oxide supported on a carrier.

10. The process of claim 1, wherein said exhaust gas containing oxides of nitrogen and ammonia is contacted with said catalyst at 200° to 650°C.

11. The process of claim 1, wherein said exhaust gas containing oxides of nitrogen and ammonia is passed through a catalyst zone at a space velocity of 1000 to 150,000 $hr^{-1}$.

* * * * *